United States Patent
Ho

(10) Patent No.: US 8,306,050 B2
(45) Date of Patent: Nov. 6, 2012

(54) SMART ADJUSTMENT OF BACKOFF COUNTER AND CONTENTION WINDOW FOR IMPROVED RANDOM ACCESS

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 351 days.

(21) Appl. No.: 12/697,098

(22) Filed: Jan. 29, 2010

(65) Prior Publication Data

US 2010/0195664 A1 Aug. 5, 2010

Related U.S. Application Data

(60) Provisional application No. 61/148,612, filed on Jan. 30, 2009.

(51) Int. Cl.
*H04L 12/413* (2006.01)
(52) U.S. Cl. .......................... 370/447; 370/462
(58) Field of Classification Search .................. 370/431, 370/445, 447, 449, 450, 458, 461, 462; 455/39, 455/500, 507, 516
See application file for complete search history.

(56) References Cited

U.S. PATENT DOCUMENTS

| | | | |
|---|---|---|---|
| 4,560,984 A * | 12/1985 | Scholl | 370/229 |
| 6,333,937 B1 * | 12/2001 | Ryan | 370/468 |
| 2002/0110085 A1 * | 8/2002 | Ho et al. | 370/230 |
| 2007/0274206 A1 * | 11/2007 | Habetha et al. | 370/222 |
| 2009/0190566 A1 * | 7/2009 | Kwon et al. | 370/345 |

OTHER PUBLICATIONS

Davenport, MedWiN MAC and Security Proposal—Documentation, IEEE P802.15, May 4, 2009.

* cited by examiner

*Primary Examiner* — Obaidul Huq
(74) *Attorney, Agent, or Firm* — Steven A. Shaw; W. James Brady; Frederick J. Telecky, Jr.

(57) ABSTRACT

A backoff counter is used to determine the start time of a contended allocation for a device. The backoff counter is set to an integer randomly drawn from the interval [1, CW], where CW is a contention window value selected based upon the priority of the traffic to be transmitted. The backoff counter is decremented for each idle contention slot detected. When the backoff counter reaches zero, the device attempts to transmit in the next contention slot. If the device receives no acknowledgement or an incorrect acknowledgment, then the transmission has failed. After a failed transmission, CW is set by alternately doubling the CW value up to a CWmax value for the user priority. CW is unchanged, if it was doubled in the last setting; and CW is doubled, if it was unchanged in the last setting.

19 Claims, 3 Drawing Sheets

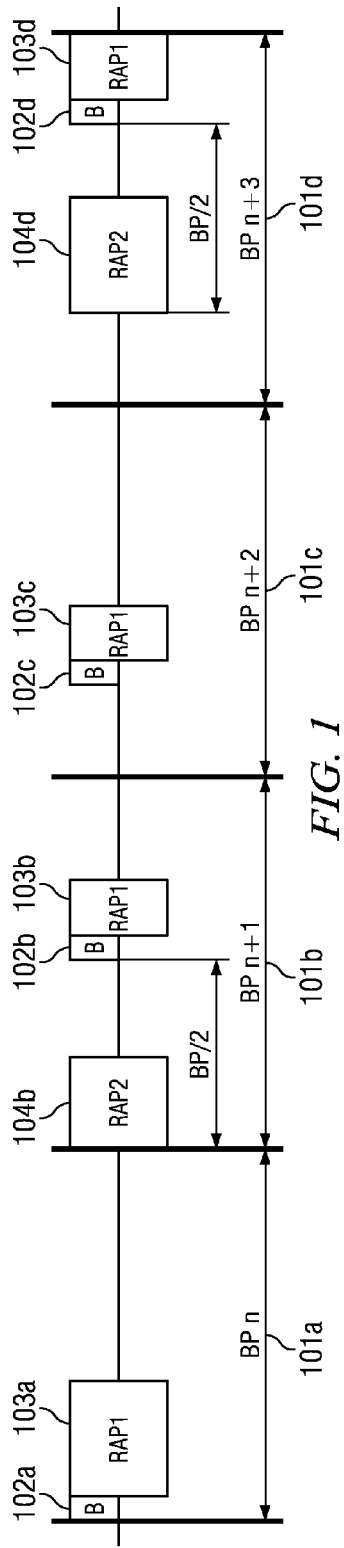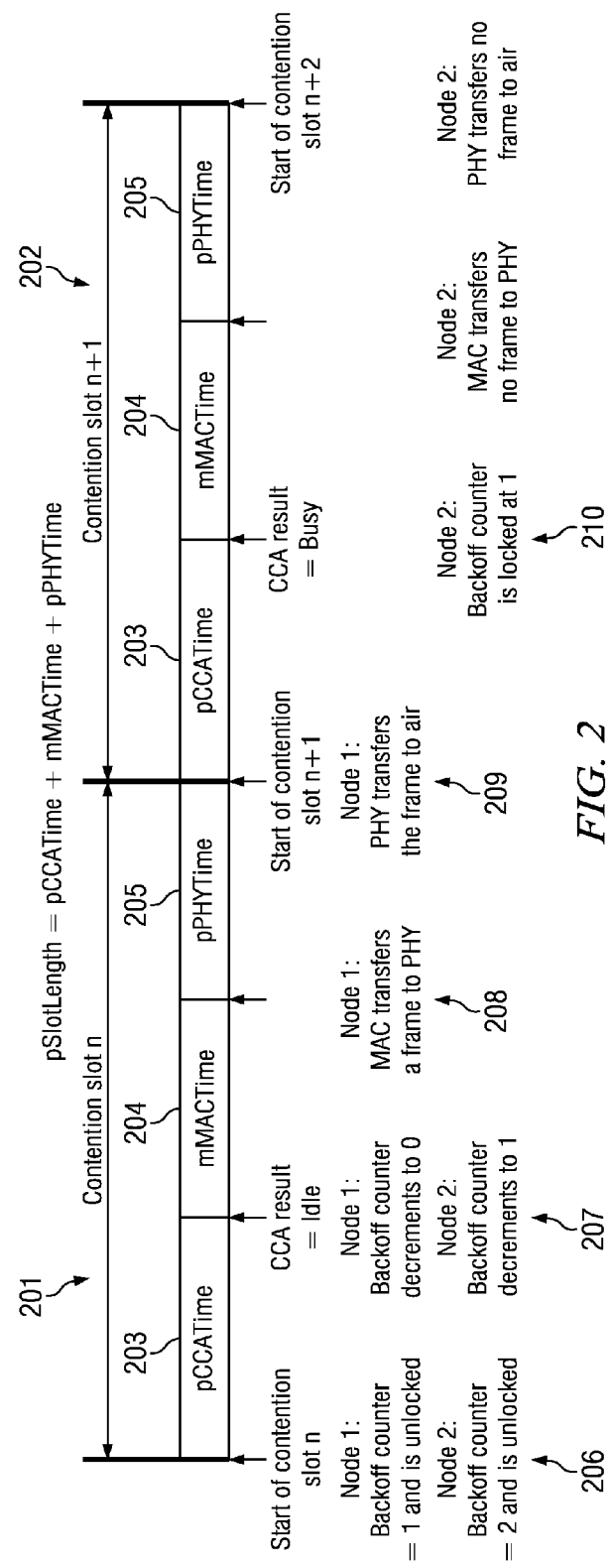

SMART ADJUSTMENT OF BACKOFF COUNTER AND CONTENTION WINDOW FOR IMPROVED RANDOM ACCESS

CROSS-REFERENCE TO RELATED APPLICATIONS

The present application claims the benefit of the filing date of U.S. Provisional Patent Application No. 61/148,612, which is titled "Backoff Counter and Contention Window Control for Contended Access" and filed Jan. 30, 2009, the disclosure of which is hereby incorporated by reference herein in its entirety.

TECHNICAL FIELD

Embodiments of the invention are directed, in general, to random access control and, more specifically, to adjusting a backoff counter and contention window in response to contention events.

BACKGROUND

In a network, nodes communicate with the network hub during designated time intervals or allocations. The time intervals may be scheduled and assigned to particular nodes. A contended allocation is a time interval having a constrained length outside of the scheduled allocations. The contended allocation is obtained by a node using carrier sense multiple access with collision avoidance (CSMA/CA), for example, for its random access. A contended allocation is typically used for unpredictable or on-demand uplink traffic, such as traffic caused by data rate variations and/or channel impairments. A contended allocation is typically used as an uplink and serves transmissions initiated by a node and corresponding acknowledgments, if any, returned by a network hub or cluster coordinator.

A node uses a backoff counter to determine the start time of a contended allocation. The node sets the backoff counter to some value and then decrements the counter upon detection of certain events. A contended allocation starts when the backoff counter decrements to zero. However, collisions between nodes that attempt to obtain access in the same contended access phases must be resolved without excessive backoffs which would otherwise lead to wasted bandwidth and increased latency.

Nodes using random access methods must also avoid conflicts with scheduled access intervals, beacon frame transmissions, and other pre-allocated time slots. As a result, the node may go through excessive resets of the backoff counter before obtaining a contended allocation. Accordingly, there is a need to resolve collisions between contended allocation intervals and avoid conflicts between contended and scheduled or other non-contended allocation intervals without requiring a node to continually double or reset the backoff counter.

SUMMARY OF THE INVENTION

Embodiments of the invention provide locking and unlocking states for the backoff counter, so that the CSMA-based contention access works seamlessly with non-contention access methods. The present invention avoids conflicts between contended and non-contended access intervals. It also provides for alternate doubling of the backoff counter or contention window to efficiently resolve an inferred collision rather than using successive doubling of the counter.

In the present invention, the backoff counter is locked and is not decremented or reset at certain times. Locking backoff counter occurs: when the backoff counter is reset upon decrementing to zero, when the channel is busy, when the current time is outside any random access phase (RAP), or when the current time is at the start of a contention slot inside a RAP but the time between the end of the contention slot and the end of the RAP is not long enough for completing a frame transaction plus a guard time. Once locked, the backoff counter is unlocked in the following situations: when the channel has been idle for a turnaround inter-frame space (TIFS), and when the current time is at the start of a contention slot inside a RAP and the time between the end of the contention slot and the end of the RAP is long enough for completing a frame transaction plus a guard time.

In the present invention, the backoff counter is set when it is at zero value and the node has traffic to send. The backoff counter is set to a sample of an integer random variable uniformly distributed over the interval [1, CW], where CW is a contention window value selected based upon the priority of the traffic to be transmitted. Initially, CW is set to a minimum value (CWmin) for the user priority to be transmitted. After successful transmission, if additional transmissions remain and contend allocations are need, the CW is reset to CWmin. A successful transmission occurs when the node either receives an expected acknowledgment correctly, or transmits a frame that does not require an acknowledgement.

If the node receives no acknowledgement or an incorrect acknowledgment, then the transmission is considered to have failed. After a failed transmission, CW is set by alternately doubling the CW value, but not to exceed CWmax for the user priority. Accordingly, following a failed transmission, CW is unchanged, if it was doubled in the last setting; and CW is doubled, if it was kept unchanged in the last setting. Alternate doubling is performed on consecutive failed transmissions. Often, redrawing the backoff counter value within the same CW interval is good enough to resolve a collision inferred from a failed transmission. An inferred collision may be due to a marginal link instead of an actual collision. After random redrawing, the contending nodes might have different backoff counter values, thereby avoiding a subsequent collision. Whereas, simply increasing the CW value (instead of redrawing) might just waste additional channel time while increasing latency.

A contention slot starts following the TIFS duration after the end of a busy period and outside a scheduled allocation or beacon transmission. New contention slots start at the end of current contention slots. The contention slot length is the sum of a busy/clear channel assessment time (i.e., the time required by a physical layer abbreviated as PHY to detect a transmission and indicate the detection to a medium access control sublayer abbreviated as MAC), plus a MAC processing time (i.e., the time required by the MAC to prepare a frame and transfer it to PHY), plus a PHY processing time (i.e., the time required by PHY to process a frame and transfer it to air).

BRIEF DESCRIPTION OF THE DRAWINGS

Figure 3:
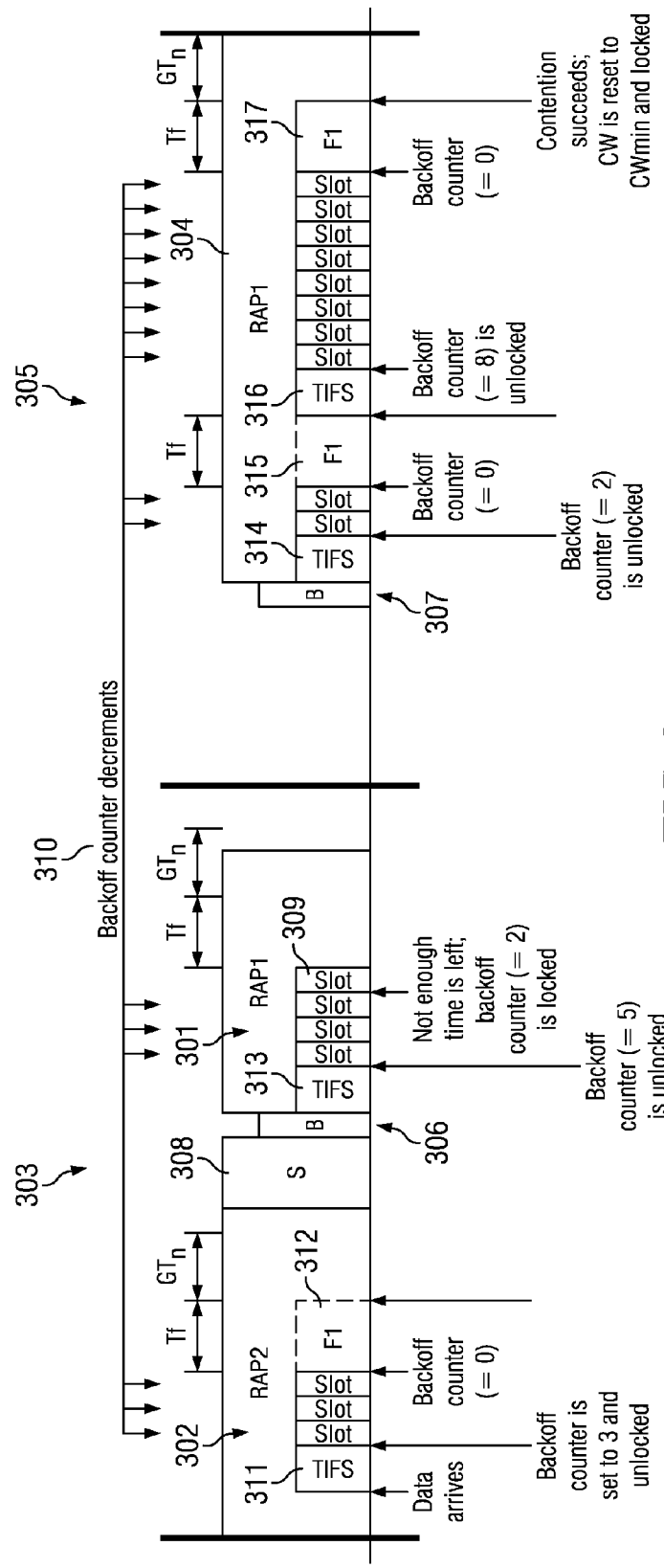
Figure 4:
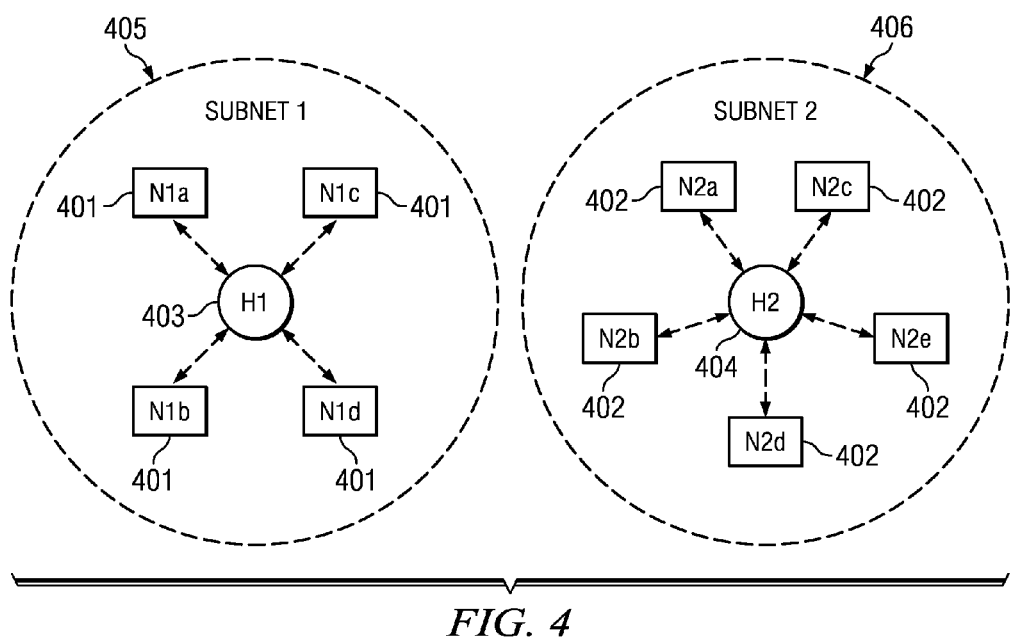
Figure 5:
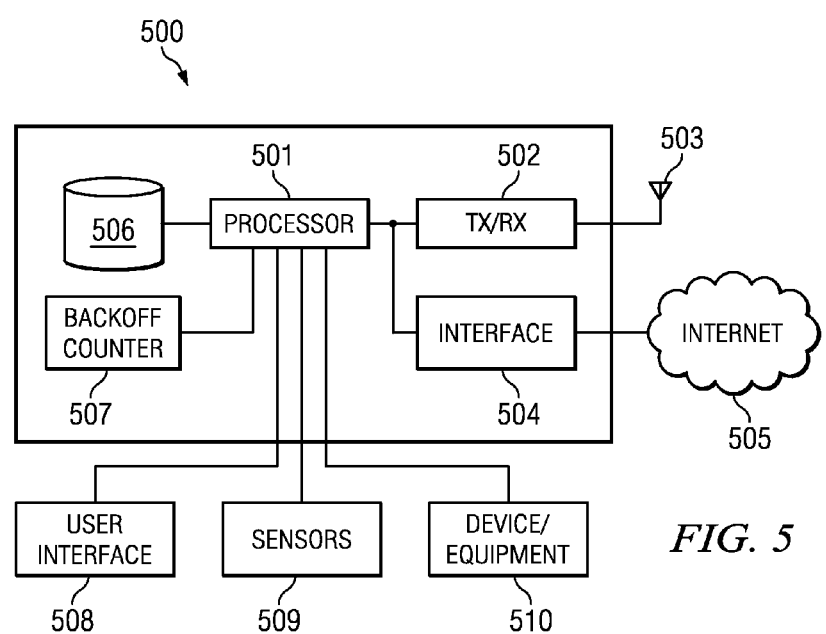

Having thus described the invention in general terms, reference will now be made to the accompanying drawings, wherein:

FIG. 1 illustrates examples of random access phases (RAP) in different beacon periods;

FIG. 2 illustrates contention slots according to one embodiment of the invention;

FIG. 3 illustrates how contended allocations are started and used in one embodiment;

FIG. 4 is a block diagram illustrating a network topology employing embodiments of the invention; and FIG. 5 is a block diagram of an exemplary embodiment of a device for providing communications with other devices in a network.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In an exemplary embodiment of the invention, a hub communicates with one or more nodes in a subnet. Different access methods are provided for nodes to initiate transactions with the hub, such as in scheduled allocations and contended allocations. In particular, a node may also employ random access based on carrier sense multiple access with collision avoidance (CSMA/CA) for initiating contention-based frame transactions. The node uses a backoff counter, as described below, to obtain contended allocations in random access phases (RAP). A contended allocation is a time interval that does not reoccur in subsequent beacon periods without the node invoking another instance of random access.

FIG. 1 illustrates examples of RAPs in different beacon periods (BP) 101a-d. Each beacon period comprises a beacon frame (B). The hub may broadcast the beacon frame at the same position within each beacon period, such as at the start of every beacon period. Alternatively, as illustrated in FIG. 1, the beacon frame 102a-d may shift to a different position in each beacon period 101a-d. In one embodiment, the hub announces up to two RAPs for the next beacon period 101a-d in each beacon frame 102a-d. A first RAP 103a-d starts immediately after the end of the beacon frame 102a-d in each beacon period 101a-d. The first RAP 103a-d has a length RAPT. The second RAP 104 has a length RAP2 and does not appear in every beacon frame 101a-d. When it does appear, the second RAP 104b,d starts half a beacon period away from the start of the beacon frame 102a-d in the same beacon period 101a-d. The hub ensures that the first and second RAPs 103a-d, 104b,d do not overlap with any scheduled allocations.

The node uses a backoff counter to identify when it can attempt to obtain a new contended allocation. When the node has at least one frame of user priority (UP) to transmit or retransmit, the node sets the backoff counter to an integer selected at random from the interval [1, CW], where CW is a contention window value. As described in more detail below, the node decrements its backoff counter by one for each idle contention slot, if the backoff counter is unlocked.

FIG. 2 illustrates contention slots according to one embodiment of the invention. The node decrements its backoff counter in each contention slot, unless the node has locked the backoff counter. The first contention slot 201 occurs after the channel has been idle for a turnaround inter-frame space (TIFS) and outside scheduled allocations or beacon frame transmissions. Successive contention slots 202 start when the current contention slot ends. Each contention slot has a fixed duration of pSlotLength, which equals the sum of pCCATime (203), mMACTime (204) and pPHYTime (205), where pCCATime is the time required by the PHY to detect a transmission (or an idle period) and indicate the detection to the MAC, mMACTime is MAC processing time that is required by the MAC to prepare a frame and transfer it to the PHY, and pPHYTime is PHY processing time that is required by the PHY to process a frame and transfer it to air (i.e. transmit the frame).

The node treats a contention slot as idle if the node determines that the channel has been idle between the start of the contention slot and the end of time pCCATime (203). When the backoff counter is unlocked, the node decrements the backoff counter at time pCCATime after the start of the contention slot. This allows the node to transmit a data frame to the transport medium (i.e. the air interface) by the end of the current contention slot when the backoff counter reaches 0 at the end of the current pCCATime. When the backoff counter reaches 0 in the current contention slot, the node obtains a contended allocation starting at the end of the current slot and lasting for a duration having a predefined maximum length (mCADurationLimit). The maximum length of the contend allocation may be a multiple of the allocation slot length (e.g. mCADurationLimit=2×allocation slot length).

The values for CW that is used to set the backoff counter value are selected based on the user priority of the traffic to be transmitted in the contended allocation. Table 1 illustrates examples of values for CWmin and CWmax that may be used in obtaining a contended allocation. Table 1 lists eight levels of user priority (UP) where 0 (e.g. background traffic) is the lowest user priority and 7 (e.g. emergency or medical event report) is the highest user priority. Each user priority level is assigned a minimum and maximum CW value.

TABLE 1

| User Priority | Traffic designation | CWmin | CWmax |
|---|---|---|---|
| 0 | Background (BK) | 16 | 64 |
| 1 | Best effort (BE) | 16 | 32 |
| 2 | Excellent effort (EE) | 8 | 32 |
| 3 | Controlled load (CL) | 8 | 16 |
| 4 | Video (VI) | 4 | 16 |
| 5 | Voice (VO) | 4 | 8 |
| 6 | Network control | 2 | 8 |
| 7 | Emergency or medical event report | 1 | 4 |

The contention window (CW) is chosen by the node as follows:
 if the node has not previously obtained a contended allocation, CW is set to CWmin[UP];
 if the node has successfully obtained a slot in the current contended allocation (i.e., the node has received an expected acknowledgment to the last frame that it transmitted in the current contended allocation), CW is set to CWmin[UP];
 if the node is transmitting a frame requiring no acknowledgment in the current contended allocation, CW is unchanged; or
 if the node has failed, (i.e., the node has not received an expected acknowledgment at the expected time):
  the node keeps CW unchanged, if this is the $m^{th}$ time the node failed since it last succeeded, where m is an odd number; or
  the node doubles CW, if this the $n^{th}$ time the node failed since it last succeeded, where n is an even number, but if doubling the CW would exceed CWmax[UP], the node shall set the CW to CWmax[UP].

The node shall lock the backoff counter when any of the following events occurs:
 the backoff counter is reset upon decrementing to 0;

the channel is busy (if the channel is busy because the node detected a frame transmission, the channel remains busy until at least the end of the frame transmission without the node having to re-sense the channel);

the current time is outside any RAP; or the current time is at the start of a contention slot inside a RAP, but the time between the end of the slot and the end of the RAP is not long enough for completing a frame transaction and setting aside a nominal guard time.

The node shall unlock the backoff counter when both of the following conditions are met:

the channel has been idle for TIFS; and the current time is at the start of a contention slot inside a RAP, and the time between the end of the slot and the end of the RAP is long enough for completing a frame transaction plus a nominal guard time.

Referring again to FIG. 2, the operation of the backoff counters for two nodes are also illustrated. At the start of contention slot 201, Node 1's backoff counter is set to 1 and is unlocked, and Node 2's backoff counter is set to 2 and is unlocked (206). At the end of pCCATime 203, both Node 1 and Node 2 treat contention slot 201 as idle. Both Node 1 and Node 2 decrement their respective backoff counters so that Node 1's backoff counter is 0, and Node 2's backoff counter is 1 (207). Having reached 0 on the backoff counter, Node 1's MAC prepares a frame and transfers it to the PHY (208). Node 1's PHY then processes the frame and transfers it to the air interface at the end of the contention slot (209).

Node 2 detects the transmission by Node 1 at the end of pCCATime 203 in contention slot 202 and locks its backoff counter at 1 because the channel is now busy (210). As a result, Node 2 does not decrement its backoff counter in contention slot 202 and, therefore, does not obtain a contended allocation or transmit a frame at the end of contention slot 202.

FIG. 3 illustrates how to start and use contended allocations in one embodiment. When a node obtains a contended allocation for a frame, the node transmits the frame at the start of the allocation. The recipient transmits an acknowledgment frame, if required, after TIFS following the end of the previous frame. To resume transmission following a received acknowledgment frame, the node transmits a new frame (or retransmits an old frame) after the TIFS duration following the end of the acknowledgment frame.

In FIG. 3, two RAPs 301, 302 are defined in a first beacon period 303, and one RAP 304 defined in second beacon period 305. RAP1's 301 and 304 start immediately after the end of the beacon frames 306, 307, and RAP2 302 starts half a beacon period away from the start of the beacon frame 306 in the beacon period 303. Scheduled allocation interval 308 is assigned to a node and is not available to random access. Blocks F1 represent frame transactions initiated by a node in a contended allocation, which require time Tf to complete. The node must end its transmission in the current contented allocation so that the last transmission in the allocation is complete at least a designated nominal guard time ($GT_n$) before the end of the allocation or the current RAP, whichever occurs first. For example, there is not enough time following contention slot 309 to allow both the frame transaction time Tf and nominal guard time $GT_n$. Therefore, the backoff counter would be locked for a node attempting to obtain a contention allocation in contention slot 309.

Backoff counter decrements 310 indicate the contention slots in which a node would decrement its backoff counter in the example illustrated in FIG. 3. After detecting a data or beacon frame transmission, the node waits a TIFS period and then begins identifying idle contention slots. The backoff counter is decremented for each idle contention slot as long as the backoff counter is unlocked.

In FIG. 3, a node sets its backoff counter to 3 and unlocks the counter after TIFS period 311 in RAP 302. The backoff counter value (i.e. 3) is set by randomly selecting an integer value between 1 and CW, where the value of CW is selected in accordance with Table 1 and the procedure described above. The node then decrements the backoff counter for each detected idle contention slot until the backoff counter reaches 0. The node then transmits data frames in block F1 312 which failed. Because there is insufficient time remaining after F1 block 312 (i.e. less than Tf+$GT_n$) before scheduled allocation 308, the node does not attempt to obtain another contended allocation in RAP 302.

After scheduled allocation period 308 and beacon frame 306, the node waits for TIFS 313 in RAP 301 before attempting to obtain another contention allocation. The node sets its backoff counter to 5 using the same CW as used previously based on the procedure described above and begins decrementing the backoff counter for each idle contention slot. As noted above, the node locks the backoff counter at slot 309 and does not decrement the backoff counter for this slot because insufficient time remains in RAP 301.

After detecting beacon frame 307 and the start of RAPT 304, the node unlocks the backoff counter following TIFS 314 and resumes decrementing the backoff counter over each idle contention slot. When the backoff counter reaches 0, the node again transmits data in block F1 315 which failed a second consecutive time. The node waits for TIFS 316 following its own random access 315 and then resets its backoff counter by setting it to randomly selected value 8 from a doubled CW. After decrementing the backoff counter following detection of eight idle contention slots, the node then transmits data in block F1 317 and succeeded at the transmission.

FIG. 4 is a block diagram illustrating a network topology employing embodiments of the invention. Nodes 401, 402 and hubs 403, 404 are organized into logical sets, referred to as subnets. In the illustrated embodiment, there is only one hub in a subnet, but the number of nodes in a subnet may vary. For example, subnet-1 405 comprises hub 403 and plurality of nodes 401, and subnet-2 406 comprises hub 404 and plurality of nodes 402. In one embodiment, messages are exchanged directly between the nodes and their respective hub—i.e. within the same subnet only. In another embodiment of the invention, messages may be exchanged between different subnets. The hub and nodes may communicate using a wireless or wireline connection. Each hub 403, 404 provides scheduled and/or random access to its respective nodes. The nodes 401, 402 may obtain a contended allocation as described herein.

FIG. 5 is a block diagram of an exemplary embodiment of a device 500 for providing communications with other devices in a network. Device 500 may be used as a node 401, 402 and/or a hub 403, 404 in FIG. 4. In one embodiment, device 500 is a hub, gateway, or controller controlling and communicating with one or more nodes. Processor 501 processes messages to be exchanged with other nodes via transceiver 502 and antenna 503 and/or via wireline interface 504 coupled to Internet or another network 505. Processor 501 may be a software, firmware, or hardware based device. Processor 501 may comprise a backoff counter and may compute a contention window for use in obtaining a contended allocation. Processor 501 may also monitor contention slots during random access phases for idle contention slots and decrements the backoff counter for idle contention slots.

Memory 506 may be used to store backoff counter data, such as user priority information, traffic designation data, previous contention window value, and minimum and maximum contention window values. Memory 506 may be secured from unauthorized access. Memory 506 may also be used to store computer program instructions, software and firmware used by processor 501. It will be understood that memory 506 may be any applicable storage device, such as a fixed or removable RAM, ROM, flash memory, or disc drive that is separate from or integral to processor 501. A backoff counter 507 may be included in device 500 for use in determining the start time of a contended allocation. The backoff counter 507 may be controlled by processor 501, or may provide information to processor 501 relative to a current countdown for a contended allocation.

Device 500 may be coupled to other devices, such as user interface 508, sensors 509, or other devices or equipment 510. In one embodiment, device 500 is a low-power wireless node operating on, in, or around a human or non-human body to serve one or more applications, such as medical connections, consumer electronics, and personal entertainment. Device 500 may be adapted to operate in a body area network either as a node or as a hub controlling a plurality of nodes. Sensors 509 may be used, for example, to monitor vital patient data, such as body temperature, heart rate, and respiration. Equipment 510 may be, for example, a monitor or other device that receives and analyzes signals, such as a patient's temperature, heart rate, and respiration, from another node. Alternatively, equipment 510 may be a device for providing a service to a patient, such as controlling an intravenous drip, respirator, or pacemaker. When used as a node or hub in a body area network, the information transmitted or received by device 500 is likely to include sensitive or critical medical information or instructions. Accordingly, it is important to ensure that device 500 is able to obtain contended allocations for data transmission.

It will be understood that the subnets 405, 406 in FIG. 4 and device 500 in FIG. 5 are presented for illustrative purposes only and are not intended to limit the scope of the systems or devices that are capable of employing a backoff counter and a contention window to obtain a contended allocation during a random access phase.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method of contending for access to a shared communications channel to transmit a message, comprising:
   initiating a backoff procedure for the message by decrementing a backoff counter by one every time the shared communications channel is idle during a contention slot of a random access phase, the backoff counter initially set to a first integer value that is randomly selected from the range [1, CW1], where a first contention window (CW1) value is selected based upon a traffic designation for the message;
   locking the backoff counter at a current value when a locking condition is identified; and
   unlocking the backoff counter when an unlock condition is identified;
   detecting a failed transmission;
   creating a second contention window (CW2) value, where the CW2 value is set to the CW1 value, if the CW1 value was doubled in a last backoff counter setting, and the CW2 value is set to double the CW2 value, if the CW1 value was unchanged in the last backoff counter setting;
   randomly selecting a second integer value from the range [1, CW2];
   resetting the backoff counter to the second integer value; and
   initiating the backoff procedure.

2. The method of claim 1, wherein the locking condition comprises: detecting that the shared communication channel is busy in a current contention slot.

3. The method of claim 1, wherein the locking condition comprises: determining that a current time corresponds to a beacon transmission time.

4. The method of claim 1, wherein the locking condition comprises: determining that a current time corresponds to a scheduled allocation.

5. The method of claim 1, wherein the locking condition comprises:
   calculating a duration between an end of a current contention slot and a start of a next beacon transmission or scheduled allocation; and
   determining that the duration is less than a frame transaction time plus a guard time.

6. The method of claim 1, wherein the unlock condition comprises: determining that the shared communications channel has been idle for a turnaround inter-frame space.

7. The method of claim 1, wherein the unlock condition comprises: determining that a current time does not correspond to a beacon transmission time.

8. The method of claim 1, wherein the unlock condition comprises: mining that a current time does not correspond to a scheduled allocation.

9. The method of claim 1, wherein the unlock condition comprises:
   calculating a duration between an end of a current contention slot and a start of a next beacon transmission or scheduled allocation; and
   determining that the duration is greater than a frame transaction time plus a guard time.

10. A method of contending for access to a shared communications channel, comprising:
    transmitting a message on the shared communications channel when a backoff counter reaches zero;
    detecting a failed acknowledgement to the message;
    resetting the backoff counter using an alternating doubling contention window procedure comprising:
    if the contention window value was not doubled during an immediately preceding backoff counter setting, then doubling the contention window value and selecting a second random value from a range defined at an upper end by the doubled contention window value;
    if the contention window value was doubled during an immediately preceding backoff counter setting, then maintaining the contention window value and selecting a third random value from a range defined at an upper end by the contention window value; and
    setting the backoff counter to the second random value or the third random value.

11. The method of claim 10, further comprising:
    determining a user priority for a message to be sent on the shared communications channel;
    selecting a first random value from a range defined at an upper end by a contention window value for the user priority;
    setting a backoff counter to the first random value;

locking the backoff counter at a present value when locking conditions apply to the shared communications channel;
unlocking the backoff counter when unlock conditions apply to the shared communications channel; and
decrementing the backoff counter when an idle contention slot is detected and the backoff counter is unlocked.

12. The method of claim 11, wherein the locking conditions are selected from the group consisting of:
the shared communication channel is busy in a current contention slot;
a current time corresponds to a beacon transmission time;
the current time corresponds to a scheduled allocation; or a remaining duration is less than a frame transaction time plus a guard time, wherein the remaining duration corresponds to a period between an end of a current contention slot and a start of a next beacon transmission or scheduled allocation.

13. The method of claim 10, wherein the unlocking conditions are selected from the group consisting of:
the shared communications channel has been idle for a turnaround inter-frame space (TIFS);
a current time does not correspond to a beacon transmission time;
a current time does not correspond to a scheduled allocation; and
a remaining duration is greater than a frame transaction time plus a guard time, wherein the remaining duration corresponds to a period between an end of a current contention slot and a start of a next beacon transmission or scheduled allocation.

14. A circuit for implementing a backoff counter used to contend for access to a shared communications channel, comprising:
a memory for storing a previous contention window value and for storing an indication whether the previous contention window value was doubled or not;
circuitry for detecting if a transmission on the shared communications channel has failed;
circuitry for retrieving the previous contention window value;
circuitry for creating a new contention window value by doubling the previous contention window value, if the previous contention window value was not doubled, or by copying the previous contention window value, if the previous contention window value was doubled;
circuitry for randomly selecting a new backoff counter value from a range of values defined in part by the new contention window;
circuitry for storing the new backoff counter value; and
circuitry for decrementing a current backoff counter value upon detection of an idle contention slot.

15. The circuitry of claim 14, further comprising:
circuitry for preventing decrementing of the current backoff counter value when a lock condition occurs, the lock condition comprising:
the shared communication channel is busy in a current contention slot;
a current time corresponds to a beacon transmission time;
the current time corresponds to a scheduled allocation; or
a remaining duration is less than a frame transaction time plus a guard time, wherein the remaining duration corresponds to a period between an end of a current contention slot and a start of a next beacon transmission or scheduled allocation.

16. The circuitry of claim 14, further comprising:
circuitry for unlocking the backoff counter when an unlock condition occurs, the unlock conditions comprising:
the shared communications channel has been idle for a turnaround inter-frame space (TIFS);
a current time does not correspond to a beacon transmission time;
a current time does not correspond to a scheduled allocation; and
a remaining duration is greater than a frame transaction time plus a guard time, wherein the remaining duration corresponds to a period between an end of a current contention slot and a start of a next beacon transmission or scheduled allocation.

17. The circuitry of claim 14, further comprising:
a memory for storing a plurality of traffic designations and corresponding minimum and maximum contention window values.

18. The circuitry of claim 17, wherein the new contention window value does not exceed a maximum contention window value corresponding to a current traffic designation.

19. A network node, comprising:
a circuit for transmitting signals to and receiving signals from a network hub;
a memory for storing a current backoff counter value; and
a backoff counter operating to:
initiate a backoff procedure for the message by decrementing a backoff counter by one every time the shared communications channel is idle during a contention slot of a random access phase, the backoff counter initially set to a first integer value randomly selected from the range [1, CW1], where a first contention window (CW1) value is selected based upon a traffic designation for the message;
lock the backoff counter at a current value when a locking condition is identified; and
unlock the backoff counter when an unlock condition is identified;
wherein the circuit is further operable to detect a failed transmission;
create a second contention window (CW2) value, where
the CW2 value is set to the CW1 value, if the CW1 value was doubled in a last backoff counter setting, and
the CW2 value is set to double the CW1 value, if the CW1 value was unchanged in the last backoff counter setting;
randomly select a second integer value from the range [1, CW2];
reset the backoff counter to the second integer value; and
initiate the backoff procedure.

* * * * *